United States Patent Office 2,842,544
Patented July 8, 1958

2,842,544

KETOSTEROID DIHYDROPEROXIDE DERIVATIVES, ITS ESTERS, TETROXANES AND METHODS OF MAKING SAME

Julien Warnant, Neuilly, Robert Joly, Montmorency, Jean Mathieu, Montfermeil, and Leon Velluz, Paris, France, assignors to Les Laboratoires Francais de Chimiotherapie, Paris, France, a French body corporate No Drawing. Application June 6, 1957
Serial No. 663,880

Claims priority, application France June 15, 1956

32 Claims. (Cl. 260—239.55)

This invention relates to new ketosteroid derivatives and to methods of making these derivatives. More particularly, the invention relates to ketosteroid dihydroperoxide derivatives of the normal series (cis A and B rings) and allo series (trans A and B rings), having the general formula $$\left[\begin{array}{c} HOO \diagdown \diagup OOH \\ C \\ \diagup \diagdown \\ R \quad R' \end{array}\right]_n$$

wherein R, R', indicating the molecular fraction adjacent to the carbonyl group or groups forming the dihydroperoxide, represent the ketosteroid part of the derivative and $n$ represents the factor 1 or a low multiple thereof.

With the exclusion of the carbon in the 11-position, the dihydroperoxide may be attached to any carbon of the A, B, C and D ring of the original ketosteroid, and in case of a 20-ketosteroid that has not been acylated at the 21-position, the dihydroperoxidation occurs at the 20-position. The ketosteroid may comprise one or several free hydroxyl groups, or hydroxyl groups that are esterified or protected by another easily removable substituent. Or the ketosteroid may have a keto group at the 11-position and other protected keto groups in form of eneamines, acetals, mercaptals, etc.

Furthermore, the invention relates to esters of the afore-described ketosteroid dihydroperoxide derivatives of the general formula

wherein R'' represents an alkyl, aryl, aralkyl or a polyacid radical of which only one carboxyl group has been esterified with the hydoperoxide, such as the succinic acid radical —$CH_2$—$CH_2$—COOH, etc.

Still furthermore, the invention relates to tetroxanes of the general formula

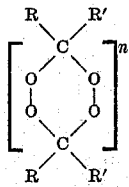

Contrary to expectations, the new dihydroperoxides were found to occur in crystallized form, to be sufficiently stable to undergo purification by recrystallization or pasting and to tolerate a certain amount of heating without decomposition. Among their most characteristic reactions is the fact that they change to the initial ketosteroids when treated with aqueous acetic acid or ammoniacal methanol at room temperature while treatment with acetic acid containing sulfuric acid converts them into tetroxanes.

The new compounds can be used in veterinary and human medicine. The change of a ketosteroid group into a dihydroperoxide does not cause an increase in toxicity and is, in certain cases, capable of modifying the pharmacodynamic properties of the initial ketosteroid. The new compounds may be also used as intermediates because they change readily at very mild reaction conditions. Thus, treatment of 20-dihydroperoxides of a pregnane- or allo-pregnane 20-one with formic acid in the cold causes conversion to etiocholane 17-ol 17-acetate or the corresponding androstane 17-ol 17-acetate, respectively. In general, these new compounds are insoluble in water and difficultly soluble in most of the usual organic solvents, but their solubility characteristics may be changed by esterification. Thus, when esterified with members of the oleic, palmitic or lauric acid group, fat-soluble compounds are obtained, while esterification products with succinic acid form salts with organic or inorganic bases, that are soluble in water.

The ketosteroid dihydroperoxide derivatives of this invention are prepared by dissolving a ketosteroid in an anhydrous, say, 4.5% solution of 100% hydrogen peroxide in a solvent such as ether, dioxane, ethyl acetate, pyridine or tertiary butanol. The solvent is then evaporated at low temperature, according to one feature of the invention by entrainment with an inert gas such as carbon dioxide. If the evaporation of the solvent by entrainment should be too time-consuming, the solvent can be removed by applying a suitably regulated vacuum and the appropriate amount of external heat to counteract the cooling effect caused by the evaporation. The residue is crystallized as a rule and consists of the desired dihydroperoxide. It is washed with water in order to eliminate excess hydrogen peroxide and is purified by pasting or recrystallization.

Applicants found that a carbonyl at the 11-position does not react under the afore-stated conditions. Likewise, the carbonyl at the 20-position of the 20-keto 21-acyloxypregnanes reacts poorly, probably due to steric hindrance. With ketosteroids possessing several reactive keto groups, such as progesterone, mixtures of dihydroperoxides are frequently produced, that may be separated by fractional crystallization.

We found that, in order to produce dihydroperoxides of 17-ketosteroids of the general formula

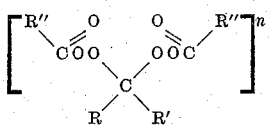

it is advantageous to employ a tertiary butyl alcohol as solvent and use a higher hydrogen peroxide concentration than in the preparation of 3- or 20-ketosteroid dihydroperoxides. Excellent results are obtained when reacting in the presence of, for example, tertiary butanol containing 7% by weight of 100% hydrogen peroxide. These solutions are prepared by dissolving hydrogen peroxide in tertiary butyl alcohol and drying the solutions by means of a dehydrating agent, such as magnesium sulfate.

In addition, we have discovered that the reaction in tertiary butyl alcohol can be carried out in the presence of catalytic amounts of hydrochloric acid. As illustrated by the examples, this modification was found to be not only also useful for the preparation of dihydroperoxides of the pregnane series, but of the androstane and estrane series. This means that the 20-dihydroperoxides of pregnane, such as substituted or unsubstituted 3-acetoxypregnane 20-one or esters thereof, as well as dihydroperoxides of estrone and its esters can be readily prepared.

The esterification of the new dihydroperoxides is carried out in accordance with conventional esterification methods, preferably with acid anhydride in the presence of a tertiary base.

EXAMPLE 1

*Preparation of 3α-acetoxy pregnane 11,20-dione 20-dihydroperoxide*

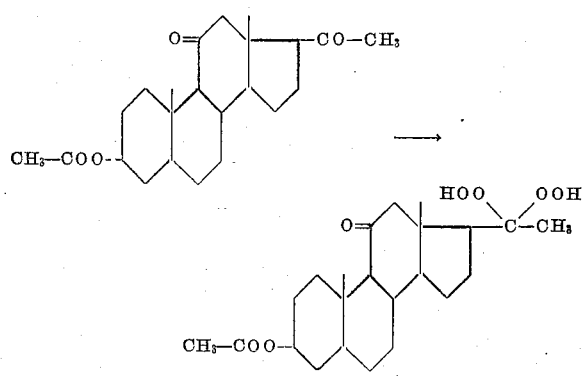

20 g. of 3α-acetoxy pregnane 11,20-dione, M. P.=135° C., $[\alpha]_D = +119°$ C. (c.=1%, acetone) are dissolved in 300 cc. of an anhydrous ether solution of hydrogen peroxide containing 4.5 g. of 100% $H_2O_2$ per 100 cc. The solvent is slowly evaporated by passing carbon dioxide gas at 15–20° C. through the solution. After 60 hours, a dry, well crystallized residue is obtained. This residue is washed by pasting with distilled water until the wash water no longer reacts with starch-iodide paper. It is then separated and dried in vacuo over potassium hydroxide. 23 g. of crude dihydroperoxide are obtained in form of colourless crystals, which is equivalent to a yield of 100%. The product contains 7.3 to 7.5% reactive oxygen (theory=7.55%).

For purification, the product is pasted several times, while cold, with 1 volume of ethyl acetate and then with ether. Thus purified, the product can be dried at 40° C. in vacuo without decomposition. This produces 20 g. of the pure product (or a yield of 87%), containing 7.55% reactive oxygen, M. P.=190° C., $[\alpha]_D^{20} = +56° \pm 2$ (c.=1%, acetone). The infra-red spectrum indicates the absence of a carbonyl group at the 20-position. This new compound is insoluble in cold water, ether, ethyl acetate, methanol, ethanol, carbon tetrachloride, soluble in cold tetrahydrofuran and pyridine.

*Analysis.*—$C_{23}H_{36}O_7 = 424.52$. Calculated: 65.07% C; 8.55% H; 26.38% O. Found: 65.1% C; 8.5% H; 26.2% O.

When treated in the cold with aqueous acetic acid or methanol-ammonia, the compound reverts to the initial 3α-acetoxy pregnane 11,20-dione at an almost quantitative yield. To accomplish this, it is sufficient to let one part by weight of the dihydroperoxide stand at room temperature with 30 volumes of 95% acetic acid or with 20 volumes of methanol containing 2.5% of 17% ammonia, and to precipitate in water.

EXAMPLE 2

*Preparation of 21-acetoxy pregnane 3,11,20-trione 3-dihydroperoxide*

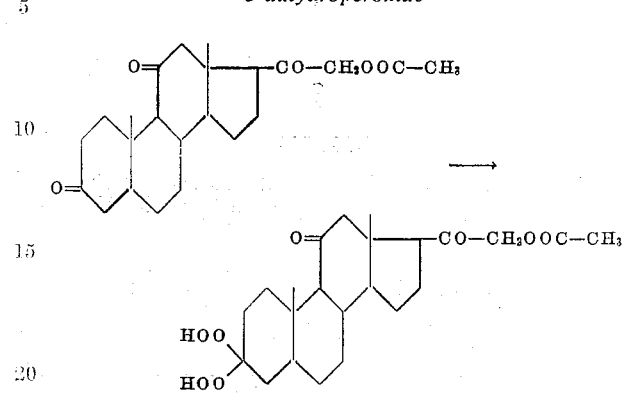

5 g. of 21-actoxy pregnane 3,11,20-trione, M. P.=154° C., $[\alpha]_D^{20} = +109° \pm 2$ (c.=1%, acetone) are dissolved at 20° C. in 300 cc. of an anhydrous mixture of ether-hydrogen peroxide containing 4.5 g. of 100% $H_2O_2$ per 100 cc. The solvent is evaporated at 20° C. and the residue treated with water as set forth in Example 1. The dried dihydroperoxide weighs 5.3 g. (or a yield of 100%), M. P.=185–186° C., and contains 7.35% reactive oxygen. After purification by means of several pastings in 2 volumes of ether, the pure product is obtained at a yield of 92.5%, M. P.=195–200° C., $[\alpha]_D^{20} = +111.5°$ (c.=1%, acetone). The solubilities of this new compound are about those of the compound described in Example 1.

*Analysis.*—$C_{23}H_{34}O_8 = 438.5$. Calculated: 62.99% C; 7.81% H; 29.19% O. Found: 63.1% C; 7.7% H; 29.1% O.

The infra-red spectrum indicates the presence of a carbonyl at the 20-position and the absence of a keto group at the 3-position.

EXAMPLE 3

*Preparation of desoxycorticosterone acetate 3-dihydroperoxide*

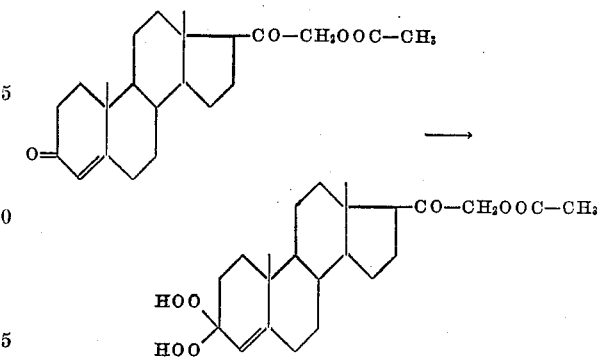

Following the method of Example 1, 5 g. of desoxycorticosterone acetate are treated with 30 cc. of an ether-hydrogen peroxide mixture containing 4.5% of anhydrous $H_2O_2$.

After the usual treatment, 5.38 g. of the desired new dihydroperoxide are obtained; M. P.=183–184° C., containing 7.6% reactive oxygen (theory: 7.53%).

EXAMPLE 4

*Preparation of progesterone 3- and 20-dihydroperoxides*

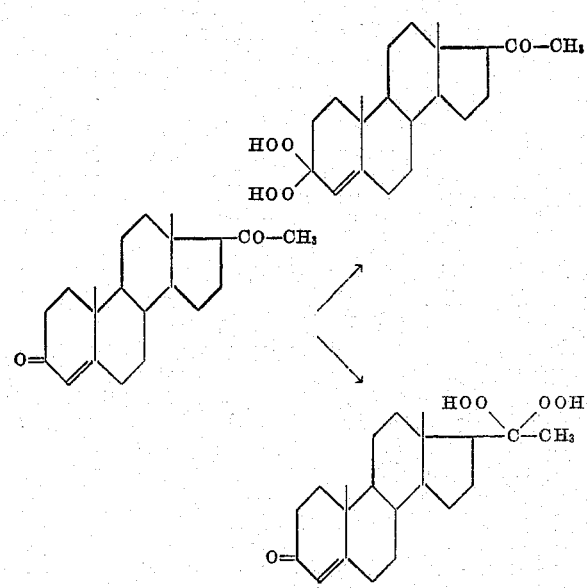

2.5 g. of progesterone, M. P.=128° C., [α]$_D^{20}$=+185° (c.=1%, ethanol) are dissolved in 60 cc. of an ether-hydrogen peroxide mixture containing 4.5% of anhydrous $H_2O_2$. The usual treatment produces 2.8 g. of a mixture consisting of progesterone 3-dihydroperoxide and progesterone 20-dihydroperoxide containing 8.6% reactive oxygen (theory: 8.8%). The ultra-violet spectrum (λ max.=240 mμ with ε=6080) indicates a mixture of 3-dihydroperoxide and 20-dihydroperoxide of progesterone.

*Analysis.*—$C_{21}H_{32}O_5$=364.47. Calculated: 69.2% C; 8.85% H. Found: 69.4% C; 8.7% H.

Upon standing for 20 hours with 20 volumes of 90% acetic acid, the mixture of these new dihydroperoxides reverts to progesterone which can be readily recovered by precipitating in water.

The two isomers are separated by means of fractionation in ethyl acetate or ether. This produces a precipitate of the less soluble progesterone 3-dihydroperoxide, M. P.=210° C., [α]$_D^{20}$=+123°±2 (c.=0.5%, tetrahydrofuran), 8.7% reactive oxygen. The ultra-violet spectrum indicates absence of absorption of the conjugated ketone at the 3-position.

The more soluble new progesterone 20-dihydroperoxide is readily recovered from the solvent.

By following the afore-described method and using 3α-acetoxy pregnane 20-one as starting material, the corresponding 20-dihydroperoxide is produced.

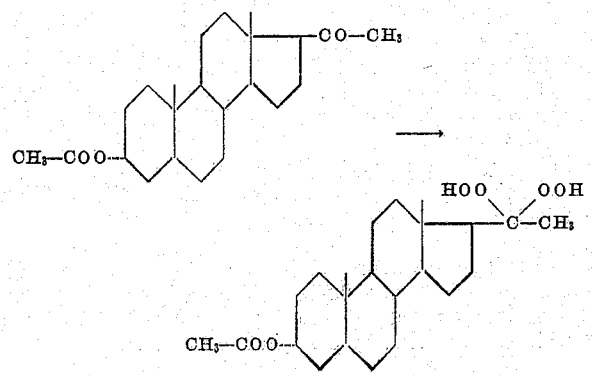

Similarly, 3α-acetoxy 11β-hydroxy pregnane 20-one produces the corresponding 20-diphydroperoxide

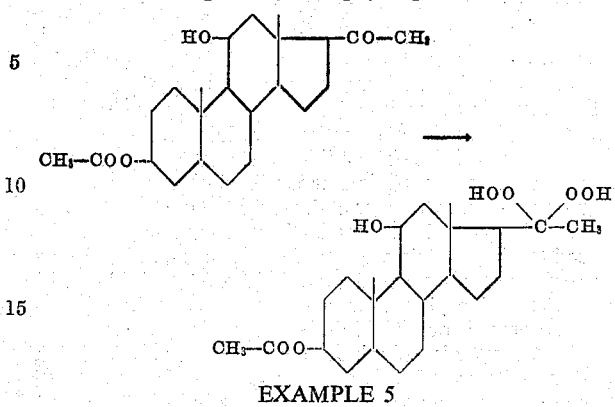

EXAMPLE 5

*Preparation of 3α-acetoxy etiocholane 11,17-dione 17-dihydroperoxide*

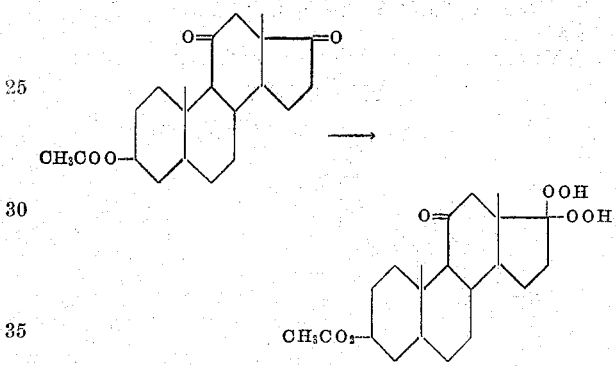

20 g. of 3α-acetoxy etiocholane 11,17-dione, prepared according to H. L. Herzog, J. Am. Chem. Soc., 1953, 75, 266, M. P.=163° C.,[α]$_D^{20}$=+145°±2 (c.=1%, acetone) are dissolved, at 20° C., in 500 cc. of an anhydrous solution of hydrogen peroxide in tertiary butyl alcohol containing 7 g. of 100% $H_2O_2$ per 100 cc. The solvent is distilled off under vacuum while entraining a stream of carbon dioxide and maintaining an interior temerature not in excess of 15 to 20° C. After the volume of the reaction mixture has been reduced to about 200 cc., the concentrate is then left standing for 24 hours and is then evaporated to dryness in the manner of the foregoing concentration step. The crystallized residue is pasted with distilled water until the wash water shows no longer a reaction with starch-iodide paper. Drying in vacuo produces 22.1 g. of the desired dihydroperoxide, corresponding to a yield of 96.5%. The product is purified by pasting with ether. After vacuum drying, 19 g. of pure dihydroperoxide are obtained, M. P. (decomp.)=190° C., [α]$_D^{20}$=0° (c.=0.5%, tetrahydrofuran). The compound contains 8% reactive oxygen (theory: 8.07%). The infra-red spectrum indicates the absence of a carbonyl group at the 17-positon. This new compound is insoluble in water and ether, soluble in tert. butanol and tetrahydrofuran.

*Analysis.*—$C_{21}H_{32}O_7$=396.47. Calculated: 63.61% C; 8.14% H. Found: 63.7% C; 8.2% H.

When treated in the cold with zinc dust and acetic acid, the compound reverts to 3α-acetoxy etiocholane 11,17-dione.

EXAMPLE 6

*Preparation of testosterone 3-dihydroperoxide*

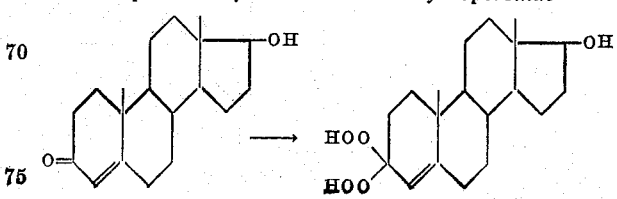

3 g. of pure testisterone are dissolved in 80 cc. of an anhydrous solution of tertiary butyl alcohol containing 7 g. of 100% hydrogen peroxide per 100 cc. One drop of concentrated hydrochloric acid is added and the solution is evaporated under reduced pressure in a carbon dioxide stream whereby the interior temperature of the evaporation vessel is carefully adjusted so as not to exceed 15°–20° C. After the reaction mixture has been reduced to aprox. 10 cc., it is left standing overnight. Going on with the vacuum concentration, crystallization commences and an oily product separates at the same time. After triturating with about 10 volumes of water and filtering with suction, the crystals are washed on a filter with aqueous acetone and aqueous ethanol, followed by filtering with suction and drying over phosphorous anhydride. The hydroperoxide obtained in this manner appears in form of colorless crystals, soluble in tetrahydrofuran, insoluble in ether and water; M. P. approx. 180° C., $[\alpha]_D^{20} = +50°$ (c.=1%, tetrahydrofuran). The analysis indicates the presence of 9.2% active oxygen (theoretical 9.4%).

*Analysis.*—$C_{19}H_{30}O_5 = 2238.43$. Calculated: 67.43% C; 8.94% H; 23.64% O. Found: 67.5% C; 9.0% H; 23.5% O.

This compound has not been previously described.

EXAMPLE 7

*Preparation of estrone acetate 17-dihydroperoxide*

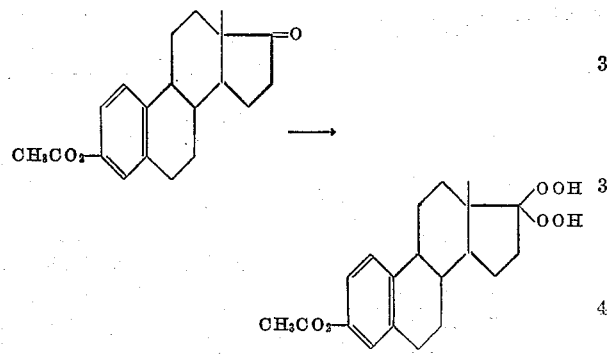

Using 2 g. of estrone acetate and operating under the conditions set forth in Example 6 employing 80 cc. of the same hydrogen peroxide solution, 1.7 g. or a yield of 90% of the desired dihydroperoxide is obtained after filtering with suction and pasting with benzene. The product melts while undergoing violent decomposition at 125° C.; $[\alpha]_D^{20} = +7.5°$ (c.=1%, tetrahydrofuran). The analysis indicates 9% of active oxygen (theoretical 8.83%). The product appears in form of white prisms that are very soluble in ether, soluble in tetrahydrofuran and insoluble in water and benzene.

*Analysis.*—$C_{20}H_{26}O_6 = 362.41$. Calculated: 66.28% C; 7.23% H; 26.49% O. Found: 66.6% C; 7.3% H; 26.4% O.

This compound has not been previously described.

EXAMPLE 8

*Preparation of 3α-acetoxy pregnane 20-one 20-dihydroperoxide*

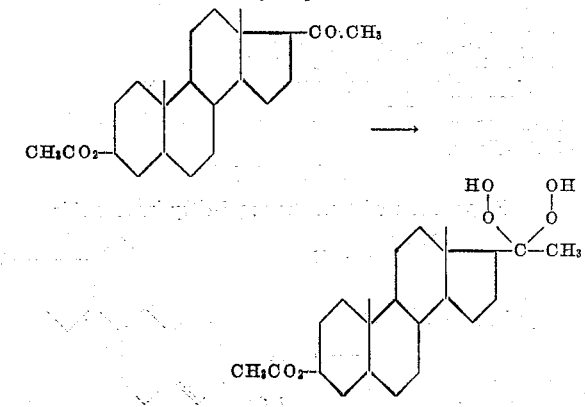

Operating according to Example 6, the following amounts of reactants are used:

3α-acetoxy pregnane 20-one (M. P. 102° C.)_____g__ 5
7% solution of anhydrous hydrogen peroxide in tertiary butyl alcohol_____cc__ 130
Concentrated hydrochloric acid_____drop__ 1

The reaction mixture is concentrated in the usual manner until it separates into two layers. The organic layer is taken up with benzene and the benzene extract is dried over anhydrous sodium sulfate, vacuum concentrated in the cold and then left standing. The resulting crystals are separated, filtered with suction and impasted several times with petroleum ether. After draining and drying, 5.7 g. or a yield of 97% of 3α-acetoxy pregnane 20-one 20-dihydroperoxide are obtained. The product, comprising ⅓ molecule of benzene of crystallization, melts at 160° C. (decomposition); $[\alpha]_D^{20} = +42.5$ (c.=1%; tetrahydrofuran). It is soluble in ether, insoluble in petroleum ether, benzene, and water.

*Analysis.* — $C_{23}H_{38}O_6 \cdot \frac{1}{3} C_6H_6 = 436.57$. Calculated: 68.77% C; 9.24% H; 21.99% O. Found: 68.8% C; 9.3% H; 21.8% O.

This compound has not been previously described.

EXAMPLE 9

*Conversion of a dihydroperoxide into the corresponding tetroxane*

*Conversion of 3α-acetoxy pregnane 11,20-dione 20-dihydroperoxide into bis (3α-acetoxy pregnane 11-one) 20-tetroxane*

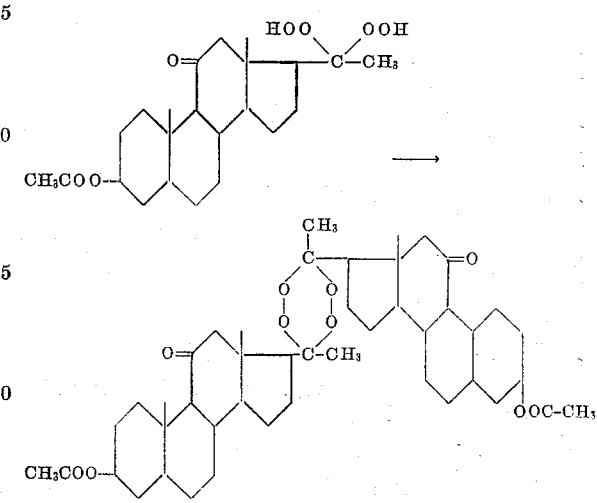

0.5 g. of 3α-acetoxy pregnane 11,20-dione dihydroperoxide described in Example 1 are dissolved in 2 cc. of acetic acid containing 1% of 66° Bé. sulfuric acid. After standing for 6 hours at 20° C., the resulting crystalline product is separated, washed with acetic acid, then with water and vacuum dried at 60° C. The product is insoluble in boiling water, ether, acetone and ethanol, but soluble in 80 volumes of 95° C. acetic acid and also soluble in cold chloroform. M. P.=270–280° C., $[\alpha]_D^{20} = +89°$ (c.=0.5%, chloroform). The infra-red spectrum of the new compound indicates absence of a carbonyl group at the 20-position. M. W. by cryoscopy in acetophenone (c.=2.45%)=760 (theory: 781).

*Analysis.*—$C_{46}H_{68}O_{10} = 781$. Calculated: 70.74% C; 8.78% H; 20.49% O. Found: 70.8% C; 8.7% H; 20.5% O.

Heating for 8 hours at 90° C. in 100 volumes of 80% acetic acid containing 0.5% of 66 Bé. sulfuric acid causes hydrolyzation into 3α-acetoxy pregnane 11,20-dione which is recovered by precipitation in water.

EXAMPLE 10

*Conversion of a 20-ketopregnane dihydroperoxide into the corresponding etiocholane 17-acetate*

*Conversion of 3α-acetoxy pregnane 11,20-dione 20-dihydroperoxide into 3α,17β-diacetoxy etiocholane 11-one*

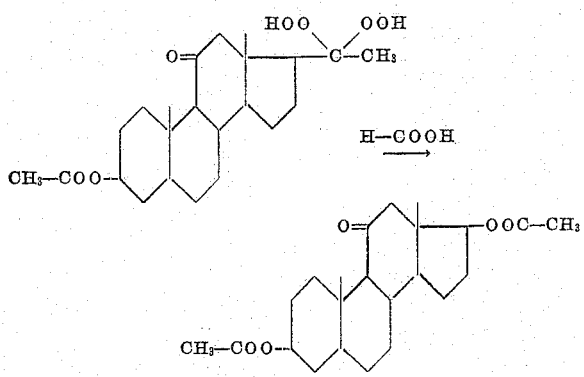

0.5 g. of 3α-acetoxy pregnane 11,20-dione 20-dihydroperoxide produced according to Example 1 are dissolved in 2 cc. of 99% formic acid. After standing 48 hours at room temperature, the solution is poured into water, extracted with ether, and the ether solution washed with water, dried over magnesium sulfate and evaporated to dryness. Recrystallization in methanol produces 3α,17β-diacetoxy etiocholane 11-one, M. P.=180° C., $[\alpha]_D^{20}=+52°\pm1.5$ (c.=1%, acetone).

Analysis.—$C_{23}H_{34}O_5=390.5$. Calculated: 70.74% C; 8.78% H; 20.49% O. Found: 70.7% C; 8.7% H; 20.6% O.

This compound has been described by L. Sarett (J. Am. Chem. Soc., 1947, 69, 2900), who indicates: M. P.= 180–181° C., $[\alpha]_D^{20}=+51.5°$ (c.=0.5%, acetone).

EXAMPLE 11

*Esterification of a ketosteroid dihydroperoxide*

*Preparation of dihydroperoxide diacetate of 3α-acetoxy pregnane 11,20-dione*

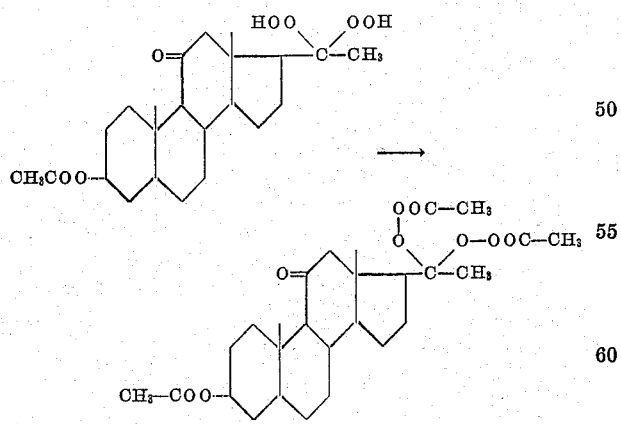

2. g. of 3α-acetoxy pregnane 11,20-dione 20-dihydroperoxide are dissolved in 4 cc. of anhydrous pyridine at 0° C. and 4 cc. of acetic anhydride are gradually added while the temperature is maintained at 0° C. After standing 20 hours at 0 to 5° C., the solution is poured into ice water and is extracted with ether. The ether solution is washed with water, dried over magnesium sulfate and then vacuum evaporated to dryness. The residue consists of 2.4 g. of the crude diacetate (representing a yield of 100%) consisting of practically pure, colorless crystals. Pasting with ether produces, after separating, the pure, new product, M. P.=80–85° C., $[\alpha]_D^{20}=+32°\pm2$ (c.=1%, acetone). The infra-red spectrum indicates the absence of a carbonyl group at the 20-position and a band

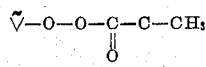

at 1794 cm.$^{-1}$.

Analysis.—$C_{27}H_{40}O_9=508.59$. Calculated: 63.76% C; 7.93% H. Found: 63.9% C; 8.0% H.

Saponification with 20% alcoholic soda solution produces 3α-hydroxy pregnane 11,20-dione, M. P.=175° C.

It will be obvious that the foregoing examples have been given to illustrate the invention, but not to limit the scope thereof. Thus, the ketosteroid starting materials may comprise, in addition to the afore-mentioned substituents, double bonds, halogens, carbonyl and hydroxyl groups other than those previously listed as well as such groups protected by appropriate blocking agents.

The melting points set forth in the respective examples are instantaneous melting points determined by means of the Maquenne block. Active oxygen has been determined iodometrically and the infra-red spectra by means of a Perkin-Elmer spectrophotometer.

We claim:

1. The group of compounds consisting of dihydroperoxides of ketosteroids having the general formula

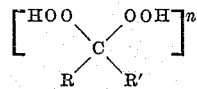

and lower aliphatic carboxylic acid and polyacid esters and tetroxanes thereof, wherein $n$ represents the factor 1 and a low multiple thereof, R, R' and C jointly represent the group consisting of 3-keto-, 17-keto-, and 21-unacylated 20-ketosteroids of the androstane, etiocholane, pregnane, and estrane series.

2. Dihydroperoxide esters of ketosteroids according to claim 1, having the general formula

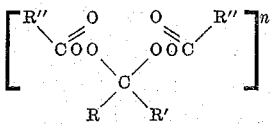

wherein R" represents a member of the group consisting of lower alkyl, and polyacid radicals, one of the carboxyl groups of which has been esterified with one of the hydroperoxide groups.

3. Tetroxanes of ketosteroids according to claim 1, having the general formula

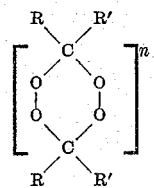

4. Dihydroperoxides of 17-ketosteroids according to claim 1, having the general formula

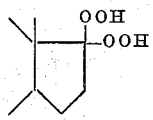

5. 20-dihydroperoxide of 3α-acetoxy pregnane 11,20-dione.

6. Diacetate of 20-dihydroperoxide of 3α-acetoxy pregnane 11,20-dione.

7. Tetroxane of 20-dihydroperoxide of 3α-acetoxy pregnane 11,20-dione.

8. 3-dihydroperoxide of 21-acetoxy pregnane 3,11,20-trione.

9. 3-dihydroperoxide of desoxycorticosterone acetate.

10. 3-dihydroperoxide of progesterone.

11. 20-dihydroperoxide of progesterone.

12. 20-dihydroperoxide of 3α-acetoxy pregnane 20-one.

13. 20-dihydroperoxide of 3α-acetoxy 11β-hydroxy pregnane 20-one.

14. 17-dihydroperoxide of 3α-acetoxy etiocholane 11,17-dione.

15. 17-dihydroperoxide of estrone acetate.

16. 3-dihydroperoxide of testosterone.

17. The method of preparing dihydroperoxides of ketosteroids having the general formula

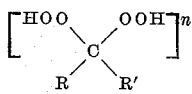

wherein $n$ represents the factor 1 and a low multiple thereof, R, R' and C jointly represent the group consisting of 3-keto-, 17-keto-, and 21-unacylated 20-ketosteroids of the androstane, etiocholane, pregnane, and estrane series, said method comprising dissolving said ketosteroid at room temperature in an anhydrous solution of 100% hydrogen peroxide in a solvent of the group consisting of ether, dioxane, ethyl acetate, pyridine and tertiary butanol, permitting the solution to stand at room temperature, removing the solvent at low temperature by entrainment with an inert gas and purifying the remaining residue.

18. The method of preparing dihydroperoxides of ketosteroids according to claim 17, wherein said solvent is removed by entrainment with an inert gas while applying vacuum and counteracting the heat loss by applying external heat.

19. The method of preparing dihydroperoxide esters of ketosteroids, having the general formula

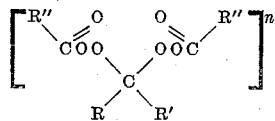

wherein n represents the factor 1 and a low multiple thereof, R, R' and C jointly represent the group consisting of 3-keto-, 17-keto-, and 21-unacylated 20-ketosteroids of the androstane, etiocholane; pregnane, and estrane series and R'' represents a member of the group consisting of lower alkyl, and polyacid radicals one of the carboxyl groups of which has been esterified with one of the hydroperoxide groups, said method comprising dissolving said ketosteroid at room temperature in an anhydrous solution of 100% hydrogen peroxide in a solvent of the group consisting of ether, dioxane, ethylacetate, pyridine and tertiary butanol, permitting the solution to stand at room temperature, removing the solvent at low temperature by entrainment with an inert gas, purifying the remaining residue, treating it with an acylating agent yielding R'' in the cold and recovering and purifying the ester.

20. The method of preparing tetroxanes of ketosteroids, having the general formula

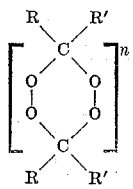

wherein $n$ represents the factor 1 and a low multiple thereof, R, R' and C jointly represent the group consisting of 3-keto-, 17-keto-, and 21-unacylated 20-ketosteroids of the androstane, etiocholane, pregnane, and estrane series, said method comprising dissolving said ketosteroid at room temperature in an anhydrous solution of 100% hydrogen peroxide in a solvent of the group consisting of ether, dioxane, ethyl acetate and pyridine, permitting the solution to stand at room temperature, removing the solvent at low temperature by entrainment with an inert gas, purifying the remaining residue, treating it at room temperature with acetic acid and sulfuric acid and separating the resulting solid product.

21. The method according to claim 17, whereby 3α-acetoxy pregnane is converted into the corresponding 20-dihydroperoxide.

22. The method according to claim 17, whereby 21-acetoxy 3,11,20-trione is converted into the corresponding 3-dihydroperoxide.

23. The method according to claim 17, whereby desoxycorticosterone is converted into the corresponding 3-dihydroperoxide.

24. The method according to claim 17, whereby progesterone is converted into equal parts of the 3- and 20-dihydroxide derivative thereof which are then separated by fractional crystallization.

25. The method according to claim 19, whereby 3α-acetoxy pregnane 11,20-dione is converted into the 20-dihydroperoxide derivative and the latter, by treating in the cold with acetic anhydride, is converted into the correspondign diacetate.

26. The method according to claim 20, whereby 3α-acetoxy pregnane 11,20-dione is converted into the 20-dihydroperoxide derivative thereof and the latter, by treating at room temperature in an acetic acid solution of concentrated sulfuric acid, is converted into the corresponding tetroxane.

27. The method of preparing dihydroperoxides of 17-ketosteroids according to claim 17, comprising dissolving a 17-ketosteroid at room temperature in an about 7% solution of 100% hydrogen peroxide in tertiary butanol.

28. The method of preparing dihydroperoxides of ketosteroids of the group consisting of pregnane, androstane, estrane and testosterone and lower aliphatic carboxylic acid and polyacid esters thereof, said method comprising dissolving one of said ketosteroid compounds at room temperature in an about 7% solution of anhydrous hydrogen peroxide in tertiary butanol, adding a catalytic trace of concentrated hydrochloric acid, permitting the solution to stand at room temperature, removing the solvent at low temperature by entrainment with an inert gas while applying vacuum, and washing and purifying the residue.

29. The method according to claim 28, whereby, after standing at room temperature, the solution is reduced to about one-eighth of the original volume by entrainment at about 15-20° C. with carbon dioxide while applying vacuum, the concentrate is reduced to dryness in the afore-said manner after standing overnight, and the residue is purified by washing with water, aqueous acetone and aqueous ethanol.

30. The method according to claim 28, wherein said ketosteroid compound is testosterone.

31. The method according to claim 28, wherein said ketosteroid compound is estrone acetate and the resulting 17-dihydroperoxide of estrone acetate is purified by pasting with benzene.

32. The method according to claim 28, wherein said ketosteroid compound is 3α-acetoxypregnane 20-one and the resulting 20-dihydroperoxide of 3α-acetoxy pregnane 20-one is purified by crystallizing from benzene and pasting with petroleum ether.

No references cited.